Sept. 30, 1969 G. DURKAN 3,469,574
PHYSIOLOGICAL FLUID INFUSION SYSTEM HAVING AUTOMATIC CUTOFF
Filed Sept. 29, 1966 3 Sheets-Sheet 1
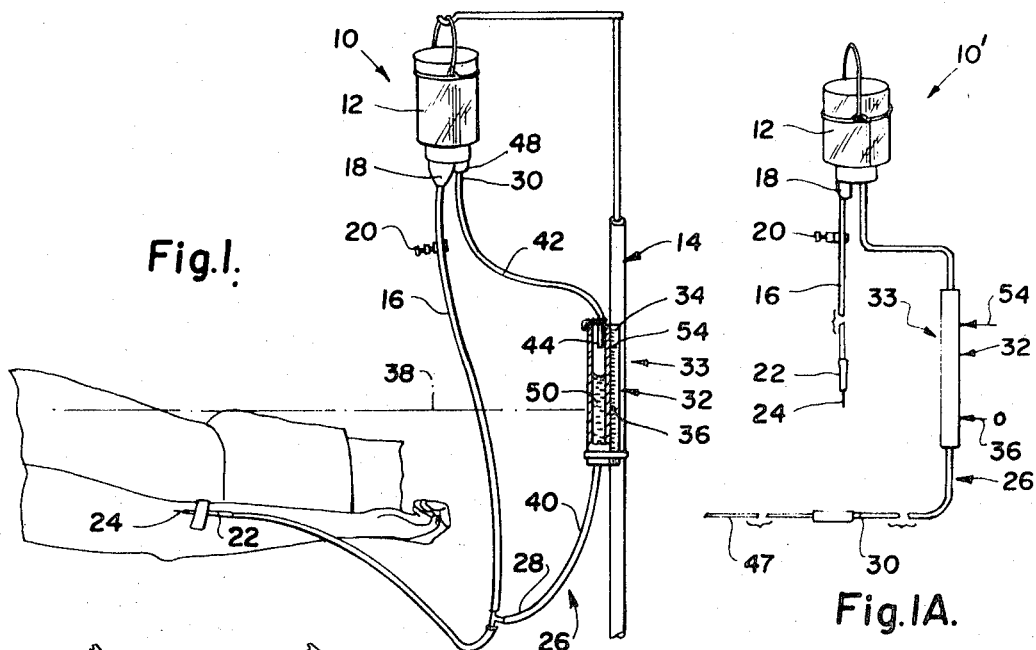
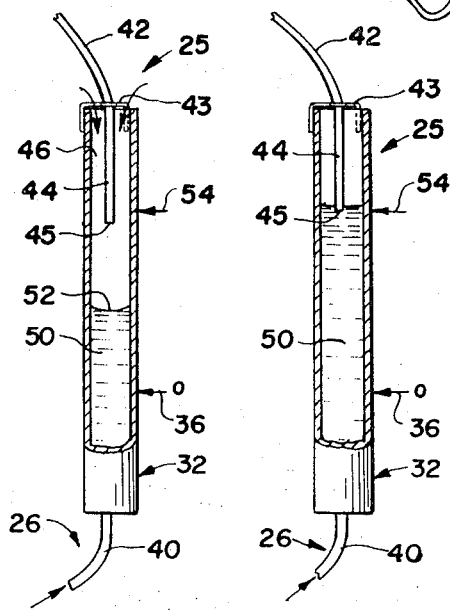
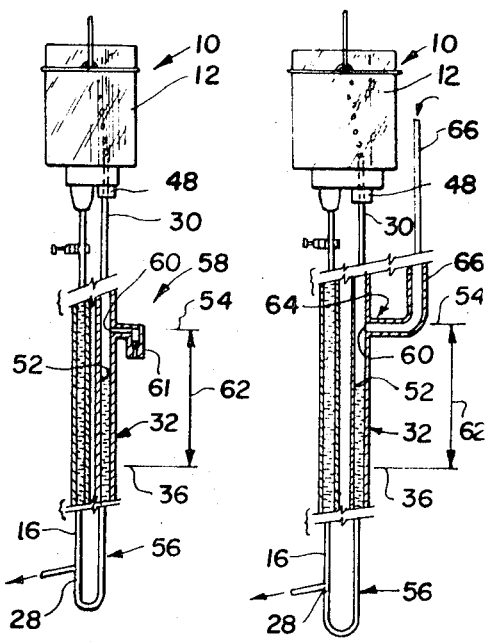
INVENTOR.
GERALD DURKAN
BY 
ATTORNEY Sept. 30, 1969  G. DURKAN  3,469,574
PHYSIOLOGICAL FLUID INFUSION SYSTEM HAVING AUTOMATIC CUTOFF
Filed Sept. 29, 1966  3 Sheets-Sheet 2
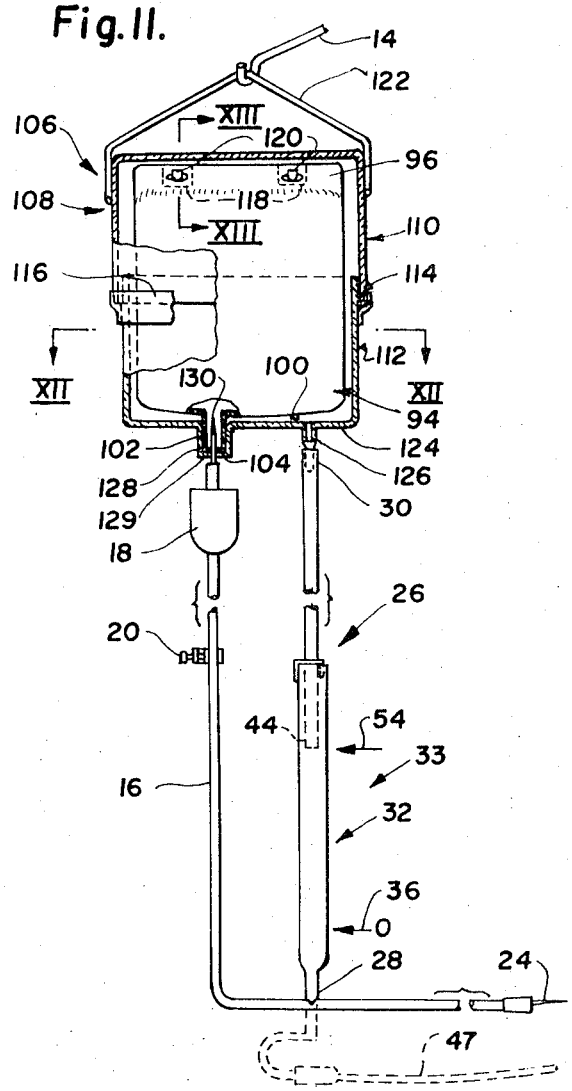
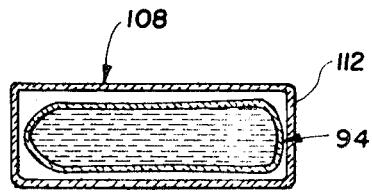
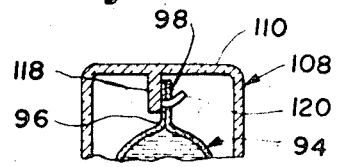
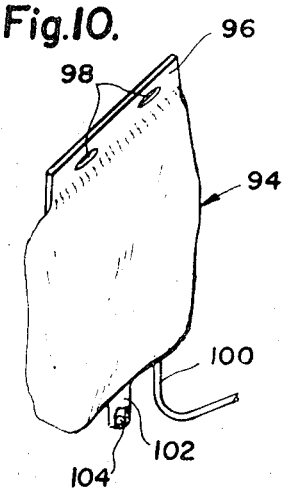
INVENTOR.
GERALD DURKAN
BY
ATTORNEY

United States Patent Office 3,469,574
Patented Sept. 30, 1969

3,469,574
PHYSIOLOGICAL FLUID INFUSION SYSTEM
HAVING AUTOMATIC CUTOFF
Gerald Durkan, 6 Emerson St., Uniontown, Pa. 15401
Filed Sept. 29, 1966, Ser. No. 582,920
Int. Cl. A61m 5/20; B67d 5/08, 5/14
U.S. Cl. 128—214
11 Claims

ABSTRACT OF THE DISCLOSURE

A physiological fluid infusion system which includes a source of physiological fluid to be infused. Additionally, conduit means are supplied for communicating with said source for conveying said physiological fluid to the patient. Furthermore, manometer means are provided included a manometer fluid for measuring venous pressure with the manometer fluid standing in the manometer means at a fluid level which is indicative of venous pressure. Finally, cut-off means are provided which is actuated by the manometer fluid and responsive to a pre-selected manometer fluid level which is indicative of abnormal venous pressuer for terminating the flow of the physiological fluid into the conduit means and, hence, to the patient.

---

This invention relates to physiological fluid infusion systems, and more particularly to a cutoff system which automatically stops infusion of the fluid when abnormally high venous pressures are encountered.

During cardiac or renal failure, there is retention of abnormal amounts of fluid in the body and an expanded blood volume accompanied by a corresponding increase in venous pressure. The expanded blood volume places an extra load on the heart, thus creating a vicious cycle. If cardiac or renal failure occurs and infusion of physiological fluids continues, further cariac decompensation and full-blown pulmonary edema may ensue. This danger is a frequently encountered problem in the older age groups in patients with compromised cardiac reserves due to arteriosclerotic and/or hypertensive heart disease. Nevertheless, in hopsital practice one must often administer parenteral fluids to these patients, frequently on an around-the-clock basis.

Consequently, it is a common practice to incorporate a manometer into the fluid infusion system to obtain a continuous indication of the venous pressure. Although the manometer will give an indication of an abnormal rise in the venous pressure, it is useless if the nursing staff does not give it relatively constant attention. Hence, in those patients which are prone to cardiac or renal failure, one nurse is required to give all of her attention to the manometer. In the event any abnormal increase in the venous pressure is detected, the nurse must stop the infusion of physiological fluid.

Accordingly, as an overall object, the present invention seeks to provide a physiological fluid infusion system having means for stopping the infusion of fluid when abnormal venous pressures are encountered.

Another object of the present invention is to provide a fluid cutoff system for intravenous infusion apparatus which operates automatically and with complete safety.

Another object of the present invention is to provide a fluid cutoff system which automatically stops intravenous infusion when abnormally high venous pressures are encountered and which automatically restarts the intravenous infusion when the venous pressure falls below a preselected level.

A further object of the invention is to provide a fluid cutoff system which is of relatively simple construction and which is relatively inexpensive to manufacture.

In the present invention, a physiological fluid infusion system is provided comprising a source of physiological fluid to be infused. A conduit communicates with the fluid source and has a remote end adapted for insertion into a vein of a patient. The conduit conveys the fluid from the source to the patient. Adjustable means is provided for controlling the rate of fluid flow in the conduit and hence to the patient. Manometer means is incorporated into the system for measuring the venous pressure. The manometer means includes a fluid whose level within the manometer means is indicative of the venous pressure.

In accordance with the present invention, cutoff means responsive to a preselected fluid level in the manometer means—his fluid level being indicative of abnormally high venous pressure—is provided for automatically stopping the flow of fluid into the conduit and hence to the patient.

Normally, the source of the fluid to be infused comprises a substantially closed container, such as a glass bottle and, in this instance, means is provided for admitting air into the container in proportion to the rate of fluid flow in the conduit. In accordance with the preferred embodiment of the present invention, the cutoff means operates to terminate the admittance of air when the preselected fluid level is attained. As should be evident, when air ceases to be admitted into the container, the flow of fluid therefrom into the conduit also ceases. When the venous pressure falls below the preselected level, the physiological fluid is again permitted to flow to the patient since air is now admitted to the container.

The source of fluid to be infused may also comprise a sealed plastic bag which collapses during infusion of the fluid. In accordance with the present invention, the plastic bag is placed in a substantially rigid sealed container having an inlet port for admitting air into its interior. The present cutoff means is incorporated into this system whereby the flow of fluid is stopped when the venous pressure rises above the preselected pressure level and is restarted when the venous pressure falls below the preselected pressure level.

In accordance with a further embodiment of the present invention, a bolus of a drug is placed in the manometer means such that when the venous pressure is less than the critical venous pressure is reached, the drug will be bubbled to the container, admixed with the physiological solution in the container and then administered to the patient. The drug is of the type having a therapeutic effect which may lower the venous pressure before the critical pressure is reached.

The above and other objects and advantages of the present invention will become apparent from the following detailed description by reference to the accompanying drawings, in which:

FIG. 1 is a schematic illustration of a physiological fluid infusion system incorporating the automatic cutoff of the present invention;

FIG. 1A is a schematic illustration of an alternative arrangement of the present physiological infusion system;

FIGS. 2A and 2B are schematic views, on an enlarged scale, of the automatic cutoff system of the present invention;

FIGS. 3 and 4 are schematic views illustrating alternative arrangements of the present automatic cutoff system;

FIG. 10 is an isometric view of a plastic bag containing a physiological fluid;

FIG. 11 is an elevation view of an infusion system employing the plastic bag of FIG. 10 as a source of physiological fluid and incorporating the automatic cutoff means system of the present invention;

FIG. 12 is a cross-sectional view taken along the line XII—XII of FIG. 11; and

FIG. 13 is a cross-sectional view taken along the line XIII—XIII of FIG. 11.

Figure 5:
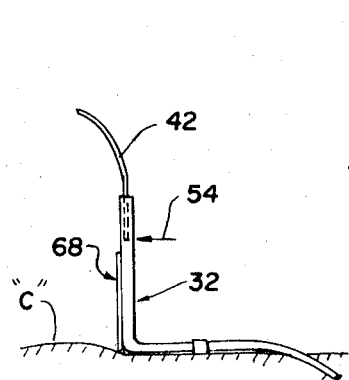
FIG. 5 is a fragmentary cross-sectional view illustrating manometer means attached to the chest of a patient who is in a reclining position.

Referring now to FIG. 1, there is illustrated a fluid infusion apparatus 10 comprising an intravenous infusion bottle 12 suspended from a conventional adjustable stand 14. Conduit means 16 communicates with the bottle 12 by way of a microdropper 18 which forms drops of the order of 0.01 cc. per drop. A clamp 20 is provided on the conduit means 16 and comprises adjustable means for controlling the rate of fluid flow from the container 12 into the conduit means 16. The conduit means 16 terminates in a hub 22 including a hollow bore needle 24 which adapts the conduit means 16 for insertion into the vein of a patient.

In accordance with the present invention, a branch conduit 26 is provided having its opposite ends 28, 30 communicating with the conduit means 16 and the bottle 12, respectively. The branch conduit 26 includes an intermediate section 32 adjustably clamped to the stand 14 in an approximately vertical position and at a desired adjusted height. The intermediate section 32 includes cutoff means 33 which, as will be more fully described, automatically terminates the flow of fluid from the container 12 when the venous pressure rises to a preselected elevated pressure and automatically restarts the flow of fluid when the venous pressure falls below the preselected elevated pressure.

The intermediate section 32 comprises manometer means and may, if desired, have a calibrated scale 34 associated therewith for indicating absolute or relative venous pressures. The scale 34 has a zero mark, at 36, which is positioned approximately along a line, indicated by the dash-dot line 38, which is aligned with the patient's heart.

Intravenous feeding is an extensively used procedure. Consequently, the manner of filling the fluid infusion apparatus 10 and commencing intravenous feeding so as to avoid the danger of air embolism is well known in the art and therefore will not be described at this time.

Reference is now directed to FIG. 1, 2A and 2B. In accordance with the preferred embodiment of the present invention, the branch conduit 26 comprises a first conduit section 40 communicating with the conduit means 16 and terminating in the aforesaid intermediate section 32; and a second conduit means 42 having an end 30 communicating with the intravenous infusion bottle 12 and a remote open end 44 including an opening 45, residing within the intermediate section 32. A suitable holder 43 secures the second conduit section 42 to the intermediate section 32. The second conduit means 42 is, of course, of a smaller diameter of the intermediate section 32 whereby an annular space 46 (FIGS. 2A, 2B) is provided.

As schematically shown in FIG. 1, the second conduit section 42 has its end 30 connected to a conventional check valve 48 of the type permitting air to bubble up through the physiological fluid in the bottle 12 while preventing the physiological fluid from flowing out of the bottle 12 into the second conduit section 42. The overall arrangement is such that the intermediate section 32 receives a quantity of the physiological fluid 50 from the conduit means 16. As the physiological fluid is being infused into the patient, the fluid 50 in the intermediate section 32 rises to a fluid level 52 which is indicative of the venous pressure.

As stated above, certain physical conditions of the patient, such as cardiac or renal failure, results in the retention of abnormal amounts of fluid in the body and an expanded blood volume. Increased blood volume is, of course, accompanied by a rise in the venous pressure. In accordance with the present invention, the opening 45 of the remote open end 44 is spaced above the zero mark 36 at a level 54 corresponding to a preselected elevated venous pressure. Although readings of the absolute venous pressure would be desirable as a basis for monitoring the condition of the patient, absolue readings are not required in the present automatic cutoff system inasmuch as relative changes in the venous pressure are important.

In FIG. 2A, the fluid level 52 stands at a normal level and air is being drawn into the annular space 46, through the opening 45 of the remote open end 44, into the second conduit section 42 and thence to the bottle 12. Intravenous infusion of the physiological fluid is being conducted in a normal manner. However, when the venous pressure rises, the fluid level 52 in the intermediate section 32 also rises. When the preselected elevated venous pressure 54 is reached, as shown in FIG. 2B, the physiological fluid 50 seals the opening 45, thereby preventing the introduction of air into the second conduit means 42 and, hence, into the bottle 12. At this time, fluid flow from the container 12 to the patient is automatically stopped. It should be evident that when the venous prossure falls below the level 54, the fluid 50 will also recede in the intermediate section 32, thereby re-opening the opening 45 whereby air is once again admitted to the container 12 and infusion of the physiological fluid is restarted.

Although the arrangement shown in FIG. 1 operates extremely satisfactory, there are instances, such as when the patient is in hypovolemic shock, wherein the alternative arrangement illustrated in FIG. 1A may be employed to advantage. As shown in FIG. 1A, a catheter 47, provided on the end 30, adapts the branch conduit 26 for insertion into the subclavian vein of a patient. The branch conduit 26 is completely disconnected from the main supply conduit 16 and the intermediate section 32 is adapted for measuring central venous pressure rather than peripheral venous pressure.

Hence, when a patient requires infusion of a physiological fluid and is, for example, in hypovolemic shock, the catheter 47 is inserted into the subclavian vein. In this instance, the intermediate section will measure the central venous pressure which is more reliable than the peripheral venous pressure especially when the patient is in hypovolemic shock. Should the patient's venous pressure rise to the preselected elevated pressure, such as indicated at 54, the cutoff means 33 of the present invention will automatically and completely terminate the flow of the physiological fluid from the container 12.

It should be readily apparent at this time that the present cutoff system is completely automatic in operation and therefore does not require the constant attention of the nursing staff. The present cutoff system can, therefore, be employed during surgery, in the recovery room and intensive care units, during blood transfusions and much routine intravenous therapy. A rapid infusion rate (over 100 drops per second) could be given without hesitancy in shock since the present cutoff system insures that the intravenous feeding will be stopped when pulmonary edema threatens, as in the middle of the night when most of the trouble occurs. A slower drip could be used to monitor cardiac and asthmatic patients. It seems reasonable that a large gage needle, (No. 18), in the arm vein would be as adequate as a catheter in the subclavian vein except in hypovolemic shock, since relative changes in pressure rather than absolute readings are important.

Various alternative embodiments of the present invention are illustrated in FIGS. 3, 4, 5–7 and 8A–8C. Corresponding numerals will be employed to identify corresponding parts heretofore described.

Referring now to FIG. 3 there is illustrated a fluid infusion system 10 provided with a continuous branch conduit 56 having an end 28 communicating with the conduit means 16 and a second end 30 communicating with the intravenous infusion bottle 12. Cutoff means 58 is provided in the intermediate section 32. In this embodiment, the cutoff means 58 comprises an opening 60 formed in the wall of the intermediate section 32. Again, the intermediate section 32 serves as manometer means having a zero mark indicated at 36. The opening 60 is spaced above the zero mark 36 at a level 54 corresponding to the preselected elevated venous pressure. Hence, a pressure range, indicated by the dimension line 62, is provided between the zero mark and the preselected elevated venous pressure 54. Since the zero mark 36 is that point on the intermediate section 32 which is aligned with the heart of the patient, the preselected elevated venous pressure 54 may be increased or decreased simply by raising or lowering the intermediate section 32.

In this embodiment, the check valve 61 is mounted on the intermediate section 32, communicates with the opening 60 and prevents spillage of the manometer fluid when the fluid level 52 reaches the opening 60. Consequently, air is passed through the check valve 61, the opening 60 into the branch conduit 56 and thence to the container 12. It should be evident that when the venous pressure of the patient rises and is equal to the preselected elevated venous pressure 54, the fluid level 52 will rise to the point where it seals the opening 60, thereby preventing further entry of air into the container 12 and hence stoppage of fluid flow from the container 12 to the patient.

Referring now to FIG. 4, there is illustrated a fluid infusion apparatus 10 provided with the continuous branch conduit 56 having the end 28 communicating with the conduit means 16 and its end 30 connected to the check valve 48 which is mounted on the bottle 12. In this embodiment, cutoff means 64 is provided comprising an opening 60 formed in the intermediate section 32. An air conduit 66 is connected to the intermediate section 32 in communicating relation with the opening 60. Consequently, air is drawn in through the air conduit 66 to the opening 60 into the branch conduit 56 and thence into the container 12. The check valve 48 mounted on the container 12, meters air into the container 12 in proportion to the fluid flow from the container 12 into the conduit means 16. Again, the intermediate section 32 serves as manometer means having a pressure range indicated by the dimension line 62. The preselected elevated venous pressure 54 may be increased or decreased simply by raising or lowering the intermediate section 32 and hence the opening 60 relative to the patient, as described above.

Figure 7:
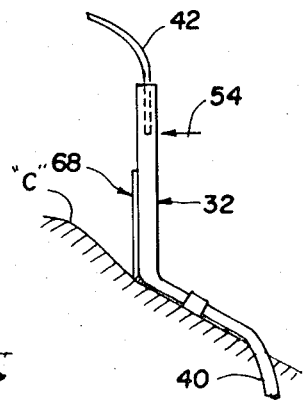
FIG. 7 is a cross-sectional view, similar to FIG. 5, illustrating the manometer means supported in a vertical position while the patient is in a semi-recumbent position.
Figure 6:
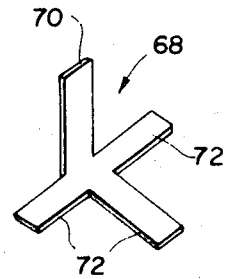
FIG. 6 is an isometric view of a splint employed in supporting the manometer means of FIG. 5.

In FIG. 5, the intermediate section 32 is shown affixed to the chest C of a patient who is in a reclining position. In FIG. 7, the intermediate section 32 is again affixed to the chest C of a patient who is in a semi-recumbent position. In both instances, the intermediate section 32 is supported in an approximately vertical position by means of a splint 68 which is more fully shown in FIG. 6. The splint 68 is formed from a lightweight easily bent metal such as aluminum. The splint 68 is in the form of a cross having an upwardly bent arm 70 which supports the intermediate section 32. The remaining arms 72 would be placed on the chest of the patient and taped thereto. A bubble leveler (not shown) may be provided to aid in placing the intermediate section 32 in the desired approximately vertical position.

Placing the intermediate section 32 on the patient's chest has certain distinct advantages. Since the intermediate section 32 is continuously in the view of the patient or the attendant, movement of the patient from the recumbent position of FIG. 5 to the semi-recumbent position of FIG. 7 or vice versa will more than likely not be attempted without readjustment in the position of the intermediate section 32. Furthermore, once the intermediate section 32 is properly positioned in relation to the patient's heart, inadvertent raising or lowering of the bed by an attendant will not affect the readings obtained from the intermediate section 32.

Figure 8A:
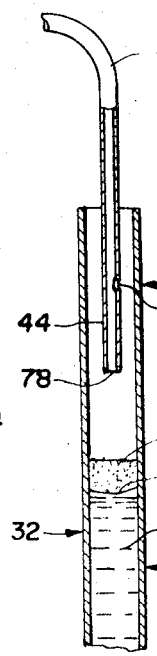
FIGS. 8A, 8B and 8C are fragmentary cross-sectional views of a manometer means provided with a bolus of a drug and illustrating the manner of transferring the drug from the manometer means to a container for admixture with the physiological fluid.

The present automatic cutoff system provides a convenient means for administering a drug whose therapeutic effect may lower the venous pressure of the patient before the critical or preselected elevated venous pressure is reached. Referring now to FIG. 8A, a bolus of a drug 76 overlies the fluid column 50 in the intermediate section 32. As will be described, the drug 76 will be conveyed through the second conduit section 42 for admixture with the physiological fluid in the bottle 12 (not shown). Inasmuch as there is little or no flow of the fluid 50 in the intermediate section 32, the bolus of the drug 76 will remain substantially intact and only a small quantity thereof will diffuse into the physiological fluid 50.

Figure 8B:
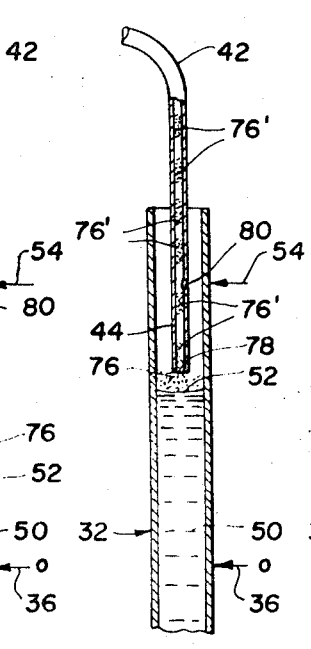

In this embodiment, the remote end 44 of the second conduit section 42 has a first opening 78 positioned below the level 54 and a second opening 80 formed in the wall of the remote open end 44 and positioned at the level 54. As a specific example, let us assume that the level 54 corresponds to a venous pressure of 15 cm. and that the first opening 78 which is spaced below the level 54, corresponds to a venous pressure of 10 cm. Hence, when the patient's venous pressure rises to 10 cm., due to cardiac or renal failure, for example, the fluid column 50 in the intermediate section 32 will also rise carrying the bolus of the drug 76 to the first opening 78, as shown in FIG. 8B. At this time time, air entering the second opening 80 will aspirate small quanities 76' of the drug into the second conduit section 42 and thence to the container 12 (not shown). The drug 76 will be admixed with the physiological fluid in the container 12 and administered to the patient. The therapeutic effect of the drug may lower the venous pressure before the level 54 is reached. In that event, the venous pressure will be lowered whereby the fluid level 52 of the physiological fluid 50 in the intermediate section 32 will also fall and infusion of the physiological fluid from the container 12 to the patient will continue in a normal manner.

Figure 8C:
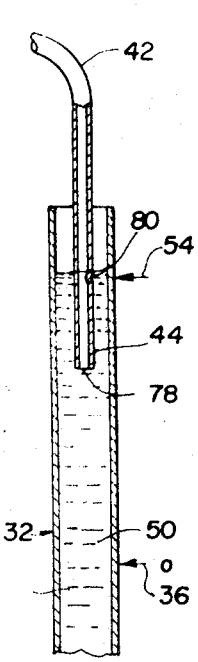

However, if the drug does not lower the venous pressure, the column of fluid 50 in the intermediate section 32 will continue to rise, as shown in FIG. 8C, until such time as the second opening 80 is sealed and air is prevented from entering into the second conduit section 42. At this time, infusion of the physiological fluid to the patient will be automatically and imediately terminated.

Figure 9:
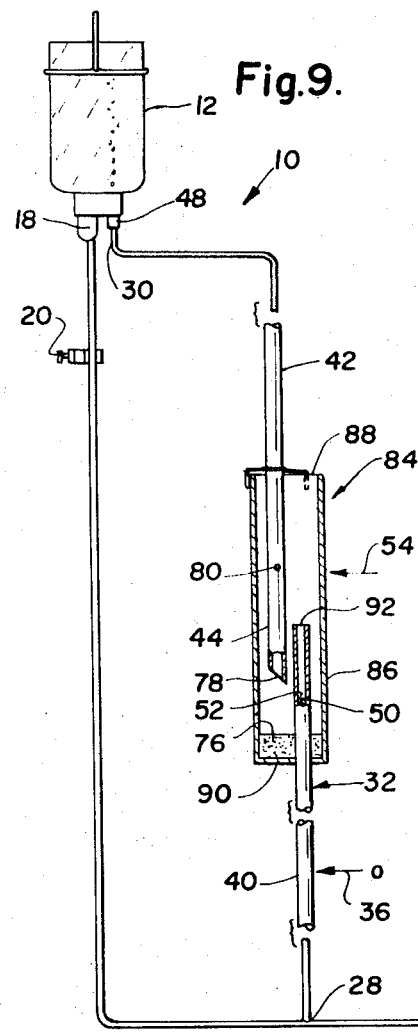
FIG. 9 is a fragmentary cross-sectional view, similar to FIG. 8A, illustrating an alternative arrangement for tarnsferring a therapeutic drop from the manometer to the container.

Referring now to FIG. 9 there is illustrated a fluid infusion system 10 provided with cutoff means 84 which is illustrated on an enlarged scale for the purpose of clarity. The cutoff means 84 provides an alternative arrangement for transferring the drug 76 to the container 12 for admixture with the physiological fluid contained therein. Corresponding numerals will be employed to identify corresponding parts heretofore described.

In this arrangement, a tubular container 86 is provided having an open top 88 and a bottom wall 90. The intermediate section 32 extends through the bottom wall 90 into the interior of the tubular container 86. The bolus of drug 76 is placed at the bottom of the container 86. The remote open end 44 of the second conduit section 42 resides within the container 86 and has its opening 78 spaced above the drug 76 but below the top 92 of the intermediate section 32. The opening 80 in the open end portion 44 is, of course, disposed at the level 54. The top 92 of the intermediate section 32 is spaced below the level 54 by a distance of, for example, 1 to 2 centimeters.

As illustrated in FIG. 9, the intermediate section 32 is measuring the venous pressure of a patient and the fluid level 52 indicates that the venous pressure is in the range between the zero centimeter mark 36 and the level 54. As the venous pressure increases, the fluid level 52 rises in the intermediatte section 32 until it reaches the top 92. At that time, the fluid within the intermediate section 32 overflows into the container 86 and is admixed with the drug 76. When the fluid level in the container 86 reaches the first opening 78, small quanities of the fluid-drug admixture will be aspirated into the second conduit means 46 and transferred to the container 12 for admixture with the physiological fluid therein.

If and when the venous pressure is lowered, the fluid 50 will recede in the intermediate section to a level indicative of the venous pressure. However, should the venous pressure continue to rise, the level of the fluid in the tubular container 86 will also continue to rise until it seals the opening 80. At this time, fluid flow from the container 12 will be completely and automatically terminated.

A further alternative embodiment of the present invention is illustrated in FIGS. 10-13, inclusive. Corresponding numerals will be employed to identify corresponding parts heretofore described.

Referring now to FIG. 10, there is shown a transparent plastic bag 94 which has now come into use as a container for physiological fluids, such as, human blood. The bag 94 may be provided with a reinforced top 96 having apertures 98 adapted to suspend the bag 94 in an inverted position. The bag 94 is also provided with an inlet conduit 100 employed to fill the bag 94 and a discharge conduit 102 having a puncturable cap 104 formed integrally therewith. Inasmuch as the bag 94 is formed from a soft plastic material, it will collapse under atmospheric pressure, as the physiological fluid is discharged. This type of bag is extremely useful inasmuch as air embolism during transfusion is entirely eliminated. Furthermore, the bag 94 may be rendered sterile and pyrogen free. It should be readily apparent that the configuration of the transparent plastic bag is not limited to that configuration shown in FIG. 10.

Reference is now directed to FIGS. 11-13, inclusive, wherein a physiological fluid infusion system 106 is illustrated. In accordance with this embodiment of the present invention, the transparent plastic bag 94 is placed within a relatively rigid transparent or translucent sealed container 108. The container 108 may comprise a top 110 and a bottom 112. As shown in FIG. 11, the bottom 112 is dimensioned to fit within the top 110. If desired, a bead and groove arrangement 114 may be formed in overlapped portions of the top 110 and bottom 112. The bead and groove arrangement 114 provides a relatively good seal and prevents air being introduced into the interior of the container 108. To further insure that air is not admitted between the overlapped portions of the top 110 and bottom 112, a strip of adhesive tape 116 may be applied thereover.

As shown in FIGS. 11 and 113, the top 110 may be provided with tabs 118 having hooks 120 which pass through the apertures 98 in the top 96 whereby the bag 94 is suspended in an inverted position. The top 110 is also provided with a wire loop 122 adapted to suspend the container 108 from the adjustable stand 14. As can be readily appreciated, the entire weight of the bag 94 is borne by the top 110 and, consequently, the seal between the overlapped portions of the top 110 and the bottom 112 is unaffected.

The bottom 112 has a lower wall 124 provided with an air inlet nozzle 126 which permits air to be introduced into the interior of the sealed container 108. The end 30 of the branch conduit 26 communicates with the air inlet nozzle 126. The lower wall 124 is also provided with a discharge nozzle 128 having a puncturable end wall 129 which seals the nozzle 128. The discharge conduit 102 is inserted into the discharge nozzle 128.

It should be understood at this time that the present invention contemplates the provision of a sealed container adapted to contain a collapsible bag and having an air inlet conduit and a discharge conduit through which the physiological fluid contained in the plastic bag 94 is discharged. Accordingly, the sealed container contemplated by this embodiment of the invention, may have a configuration other than the configuration specifically shown in FIGS. 11-13.

The conduit 16 is provided with a cannula 130 which punctures the end wall 129 and the cap 104 in the discharge conduit 102 and thereby communicates the physiological fluid within the bag 94 to a microdropper 18 also connected into the conduit 16. It should be appreciated that the discharge nozzle 128 may be rendered sterile and pyrogen free so as not to contaminate the cannula 130. The conduit 16 will, of course, have its opposite end adapted for insertion into the vein of the patient, as by means of the hollow bore needle 24 (FIG. 1).

In this embodiment, the branch conduit 26 has one end 28 communicating with the conduit 16 and its opposite end 30 connected in communicating relation with the air inlet nozzle 126 of the sealed container 108. The cutoff means 33, comprising the intermediate section 32 of the branch conduit 26 and the remote open end 44, is identical in operation and construction to that cutoff means described above and illustrated in FIGS. 1, 2A and 2B.

In operation, as long as air is being admitted into the interior of the sealed container 108, the transparent plastic bag 94 will collapse, under atmospheric pressure, and infusion of the physiologial fluid by way of the conduit 16 will be possible. However, when the venous pressure of the patient rises to the preselected level, as indicated at 54 in FIG. 11, the fluid within the intermediate section 32 will also rise and seal the remote open end 44. At this time, air ceases to be introduced into the interior of the sealed container 108 and the plastic bag 94 can no longer collapse which results in a termination of the flow of physiological fluid through the conduit 16 and to the patient. However, should the venous pressure fall below the preselected level, the fluid level within the intermediate section 32 will also fall thereby permitting air to be introduced into the interior of the sealed container 108 through the remote open end 44 and the air inlet nozzle 126. At this time, the bag 94 is permitted to collapse and the flow of physiological fluid is restarted.

It should be apparent that either of the previously-described cutoff means 58 and 64 may be used in place of the cutoff means 33. Similarly, the branch conduit 26 may communicate with the conduit 16 as shown in full lines in FIG. 11 or it may be provided with the catheter 47 which adapts the same for insertion into the subclavian vein of the patient for measuring central venous pressure rather than peripheral venous pressure.

Although the invention has been shown and described in connection with certain specific embodiments, it will be readily apparent to those skilled in the art that various changes in form and arrangement of parts may be made to suit requirements without departing from the spirit and scope of the present invention.

I claim as my invention:

1. In a physiological fluid infusion system including an intravenous infusion container containing a physiological fluid to be infused, a supply conduit extending from said container, and means adapting the remote end of said supply conduit for insertion into a vein of a patient, the combination of a branch conduit having an intermediate section in an approximately vertical position and at a desired adjusted height and opposite ends connected in communicating relation with said supply conduit and said container, said branch conduit receiving a quantity of said physiological fluid which rises into said intermediate section to a fluid level indicative of venous pressure;

said branch conduit having an opening which admits air into said container in accordance with said rate of fluid flow, said opening being spaced above said level whereby a preselected venous pressure raises fluid level whereby a preselected venous pressure raises said fluid level by an amount sufficient to seal said opening and prevent entry of air into said container and, hence, stop the flow of said fluid from said container to said supply conduit.

2. The combination as defined in claim 1 wherein said branch conduit comprises a first conduit section communicating with said supply conduit and terminating in said intermediate section, the remote end of said intermediate section being opened to the atmosphere; and a second conduit section communicating with said container and having a remote open end for passing air into said container, said remote open end residing within said intermediate section and being of a size sufficient to permit passage of air into said intermediate section through said remote open end and to said container, said remote open end being positioned for sealing engagement by said fluid when said preselected venous pressure is attained.

3. The combination as defined in claim 1 including a second branch conduit communicating with said opening.

4. A physiological fluid infusion system for administering predetermined amounts of fluid and which will automatically terminate the flow of fluid to a patient when the venous pressure of the patient is abnormal comprising:

conduit means adapted to be connected to a source of physiological fluid and adapted to be connected to a patient so as to convey the physiological fluid to the patient;

manometer means including a manometer fluid for measuring relative venous pressure connected to said conduit means, said manometer fluid in said manometer at a level indicating relative venous pressure; and cut-off means within said manometer actuated by said manometer fluid and responsive to a predetermined manometer fluid level thereof which is indicative of abnormal venous pressure for substantially terminating the flow of said physiological fluid into said conduit means, and hence, to said patient.

5. The combination as defined in claim 4 wherein said manometer means has means thereon adapted to be affixed to the chest of a patient.

6. The combination as defined in claim 4 wherein said conduit means is connected to a source of physiological fluid.

7. The combination as defined in claim 6 wherein said source of physiological fluid includes a substantially sealed container containing fluid to be infused, means for admitting air into said container in proportion to the flow of fluid from said container, and said cut-off means being operably connected to said means for admitting air to deactivate the same when said predetermined fluid level is attained.

8. A physiological fluid infusion system for administering predetermined amounts of fluid and which will automatically substantially terminate the flow of fluid to a patient when the venous pressure of the patient rises to an abnormal level and which will automatically re-start the flow of fluid when the venous pressure of the patient returns to below the abnormal level comprising:

conduit means adapted to be connected to a source of physiological fluid and adapted to be connected to the paient so as to convey the physiological fluid to the patient;

manometer means including a manometer fluid for measuring relative venous pressure conducted to said conduit means, said manometer fluid in said manometer at a level indicating relative venous pressure;

cut-off means within said manometer actuated by said manometer fluid and responsive to a predetermined manometer fluid level thereof which is indicative of abnormal venous pressure for substantially terminating the flow of said physiological fluid into said conduit means and, hence, into said patient, and re-start means on said cut-off means so as to be actuated by said manometer fluid and responsive to a predetermined manometer fluid level thereof which is indicative of relative normal venous pressure for re-initiating the flow of said physiological fluid into said conduit means and, hence, into said patient after said cut-off means has been actuated and said venous pressure has returned to normal.

9. A physiological fluid infusion system for administering predetermined amounts of fluid and which will automatically administer a therapeutic drug to a patient when the venous pressure of the patient reaches a predetermined point and will automatically substantially terminate the flow of fluid when the venous pressure of the patient reaches a second predetermined point of abnormal venous pressure comprising:

conduit means adapted to be connected to a source of physiological fluid and adapted to be connected to the patient so as to convey the physiological fluid to the patient;

manometer means including a manometer fluid for measuring relative venous pressure connected to said conduit means, said manometer fluid in said manometer at a level indicating relative venous pressure;

means on said manometer means for receiving and containing a bolus of a therapeutic drug;

means on said manometer means for introducing the drug into the system when said manometer fluid level reaches said predetermined level so as to convey said drug to said patient; and cut-off means actuated by said manometer fluid and responsive to said second predetermined manometer fluid within said manometer which is indicative of abnormal venous pressure for substantially terminating the flow of said physiological fluid and said drug into said conduit means and, hence, to said patient.

10. A physiological fluid infusion system comprising:

a source of physiological fluid to be infused;

conduit means communicating with said source for conveying said physiological fluid to a patient;

manometer means including a manometer fluid for measuring venous pressure, said manometer fluid standing in said manometer means at a fluid level indicative of venous pressure;

cut-off means actuated by said manometer fluid and responsive to a pre-selected manometer fluid level thereof which is indicative of abnormal venous pressure for terminating the flow of said physiological fluid into said conduit means and, hence, to said patient;

a bolus of a therapeutic drug;

means on said manometer means for containing said drug; and means communicating with said source and operable at a second pre-selected manometer fluid level which is less than the first said pre-selected manometer fluid level for conveying said drug to said source for subsequent delivery to said conduit means.

11. A physiological fluid infusion system comprising:

a source of physiological fluid to be infused;

conduit means communicating with said source for conveying said physiological fluid to a patient;

manometer means including a manometer fluid for measuring venous pressure, said manometer fluid standing in said manometer means at a fluid level indicative of venous pressure;

cut-off means actuated by said manometer fluid and responsive to a pre-selected manometer fluid level thereof which is indicative of abnormal venous pressure for terminating the flow of said physiological fluid into said conduit means and, hence, to said patient;

a relatively rigid sealed container;

said source comprising a sealed collapsible bag containing fluid to be infused, said collapsible bag residing within said sealed container;

second conduit means communicating with the interior of said sealed container and with the atmosphere for admitting air into the interior of said sealed container; and said cut-off means being operably connected to said conduit means and terminating the flow of air into said sealed container when said pre-selected manometer fluid level is attained.

References Cited

UNITED STATES PATENTS

| | | | |
|---|---|---|---|
| 1,705,845 | 3/1929 | Woodman | 137—453 |
| 2,742,901 | 4/1956 | Krauthamer | 128—214.2 |
| 3,216,418 | 9/1965 | Sciscowicz | 128—214 |
| 3,242,920 | 3/1966 | Andersen | 128—214 |
| 3,316,910 | 5/1967 | Davis | 128—227 |

RICHARD A. GAUDET, Primary Examiner

MARTIN F. MAJESTIC, Assistant Examiner

U.S. Cl. X.L.

128—227; 222—64